United States Patent [19]

Carte

[11] Patent Number: 4,470,302

[45] Date of Patent: Sep. 11, 1984

[54] INDICATING SHIPPING ACCELEROMETER

[76] Inventor: Norman E. Carte, 921½ E. Harvard Pl., Ontario, Calif. 91764

[21] Appl. No.: 390,400

[22] Filed: Jun. 21, 1982

[51] Int. Cl.³ ............................................. G01P 15/04
[52] U.S. Cl. ....................................... 73/492; 116/203
[58] Field of Search ................ 73/492, 491, 514, 493; 116/203

[56] References Cited

U.S. PATENT DOCUMENTS

| | | | |
|---|---|---|---|
| 3,097,534 | 7/1963 | Pasieka | 73/492 |
| 3,117,455 | 1/1964 | Shepherd | 73/492 |
| 3,561,272 | 2/1971 | Davis | 73/492 |
| 4,103,640 | 8/1978 | Feder | 73/492 |

FOREIGN PATENT DOCUMENTS

| | | | |
|---|---|---|---|
| 2283445 | 4/1976 | France | 73/492 |
| 814800 | 6/1959 | United Kingdom | 73/514 |

Primary Examiner—James J. Gill
Assistant Examiner—John E. Chapman, Jr.

[57] ABSTRACT

An indicating shipping accelerometer having a transparent tube within which an inertial mass moves indicators relative to a scale affixed to the transparent tube to give an indication of the maximum shock incurred in either direction of its longitudinal axis. Springs on either side of the inertial mass maintain the inertial mass in its initial position. The unit may be reset for reuse by inserting a wire through the endcaps and repositioning the indicators.

2 Claims, 5 Drawing Figures

INDICATING SHIPPING ACCELEROMETER

BACKGROUND OF INVENTION

My invention is an indicating shipping accelerometer which indicates the amount and direction of shock incurred to an item during shipment.

Damage to items during shipment is a common occurance. A means of allowing a person accepting a shipped item to know that a shock was incurred and the approximate magnitude of the shock would be a definite asset.

SUMMARY OF INVENTION

It is therefore an object of my invention to provide an indicating shipping accelerometer which will indicate shock in both directions and give the approximate magnitude of the maximum shock incurred to an item during shipment.

Another object of my invention is to provide an indicating shipping accelerometer which is simple in construction and operation and also inexpensive to manufacture.

Yet another object of my invention is to provide an indicating shipping accelerometer which can be reset and used more than one time.

These objects are attained in an indicating shipping accelerometer where an inertial mass is centered by springs inside a clear tube. A shock imparted to the tube causes the tube to move in the direction of the shock while the inertial mass tends to remain fixed in space. This action displaces the inertial mass relative to the tube. At the same time one of the two indicators on either side of the inertial mass is displaced along with the inertial mass.

Springs re-center the inertial mass while the displaced indicator is held in place by friction between itself and the transparent tube.

The displaced position of the indicator can be read on an attached scale which may be calibrated to give an approximate indication of the magnitude of the shock incurred.

Since there is an indicator and spring on either side of the inertial mass, the indicating shipping accelerometer will give an indication of the maximum shock incurred in either direction.

By inserting a long thin wire through a small hole in each endcap, the indicators can be reset to their initial positions. In this way the indicating shipping accelerometer can be reused.

DESCRIPTION OF A PREFERRED EMBODIMENT

Figure 1:
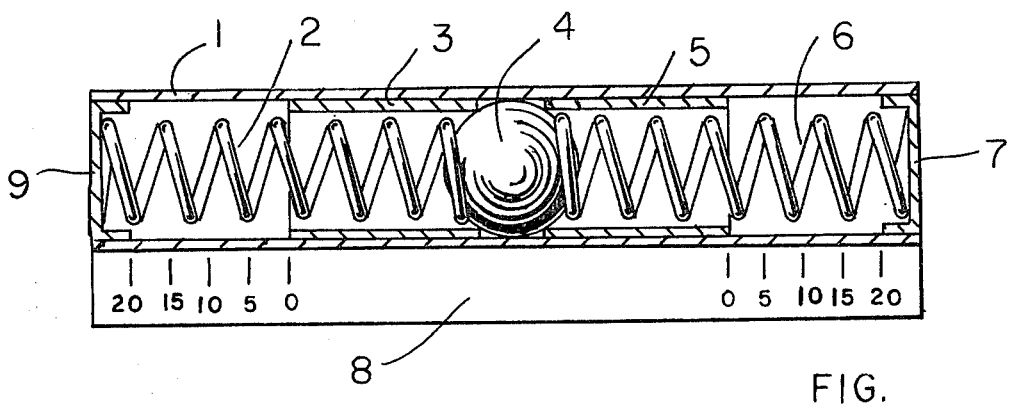
FIG. 1 is a longitudinal section through the indicating shipping accelerometer according to this invention.

As shown in FIG. 1 an indicating shipping accelerometer having a transparent plastic tube 1 inside which a steel ball 4 serves as an inertial mass. Springs 2 and 6 maintain the steel ball 4 in its undisturbed position.

On either side of the steel ball 4 are opaque plastic indicators 3 and 5. Closing the transparent tube 1 at either end are end caps 7 and 9.

Figure 2:
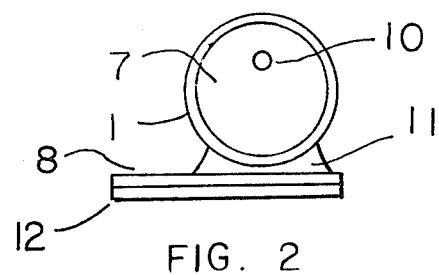
FIG. 2 is an end view showing FIG. 1 rotated 90 degrees about its vertical axis.

A scale 8 is secured with epoxy 11 as can best be seen in the end view of FIG. 2.

Shown in FIG. 2 is the hole 10 in one of the end caps 7. Both end caps 7 and 9 have such a hole, through which the indicators 3 and 5 may be repositioned with a thin wire.

Also shown in FIG. 2 is the double sided adhesive tape 12 which may be used to attach the indicating shipping accelerometer to a shipping container or shipped item.

Figure 3:
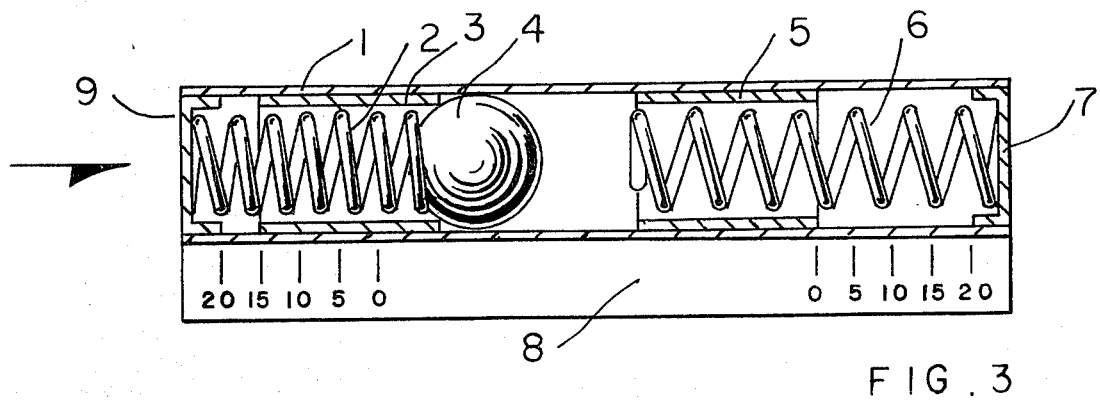
FIG. 3 is a longitudinal section showing a shock in the direction of the arrow.

FIG. 3 illustrates what happens when a shock occurs. A shock in the direction of the arrow would displace the transparent tube 1 in the direction of the shock. Inertia would tend to hold the steel ball 4 in its initial position, thereby compressing spring 2 and also displacing indicator 3 by an amount proportional to the magnitude of the shock experienced.

Figure 4:
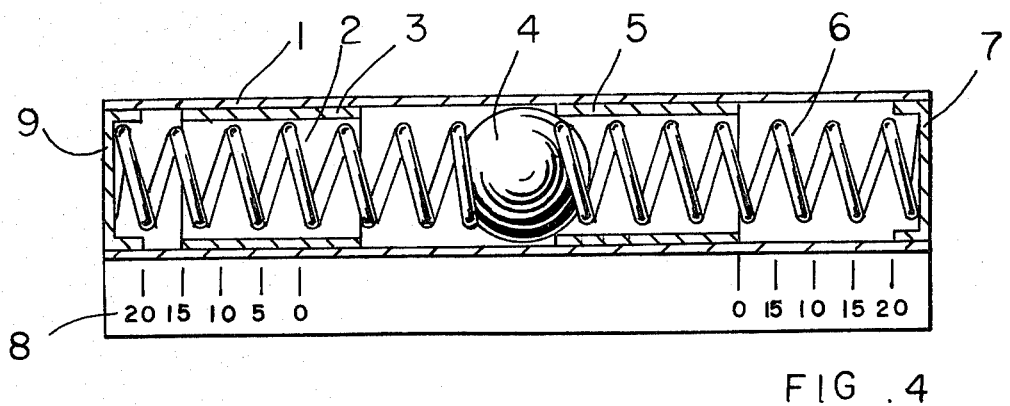
FIG. 4 is a longitudinal section showing the result of the shock in FIG. 3.

FIG. 4 illustrates the result of the shock. Springs 2 and 6 re-center the steel ball 4. Indicator 3 is held in its displaced position by the friction between itself and the transparent tube 1.

The approximate magnitude of the shock incurred can be read by observing the number on the scale 8 at which the leftmost edge of indicator 3 most nearly aligns.

After each use the indicating shipping accelerometer can be reset by inserting a thin wire through the hole in either end cap 7 or 9, and pushing the appropriate indicator 3 or 5 back to its initial position.

Figure 5:
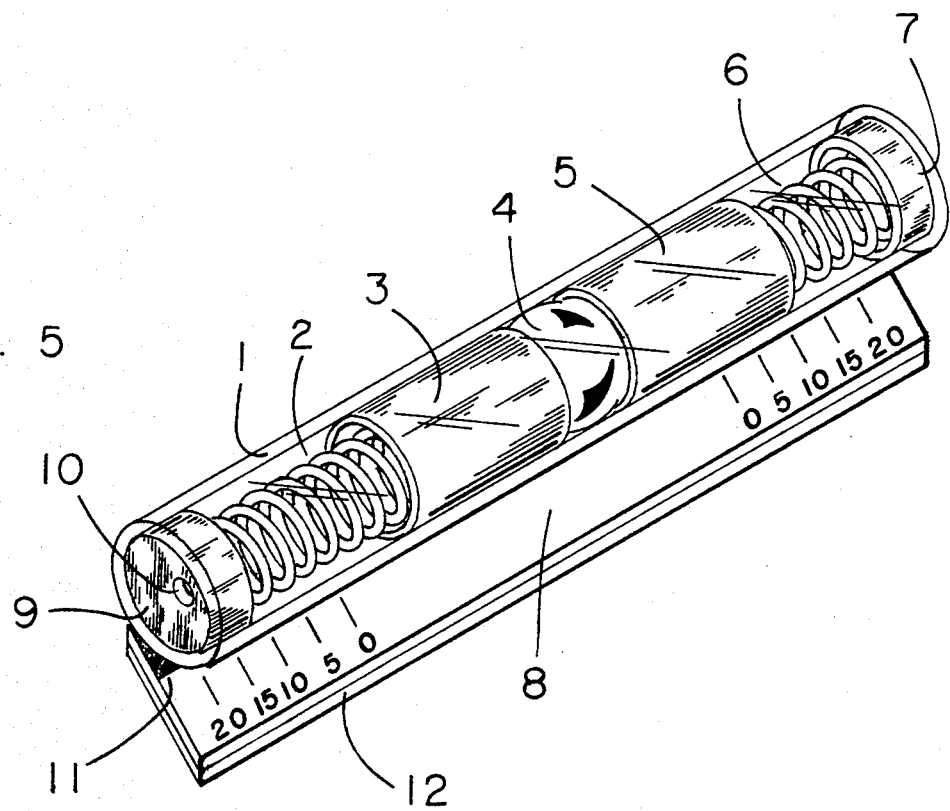
FIG. 5 is a somewhat isometric view of the indicating shipping accelerometer according to this invention.

FIG. 5 shows the complete indicating shipping accelerometer in perspective to give a better idea of the relative size and position of each component.

The invention described above may also be useful in applications other than that described, it is not intended to be limited to the details shown, since modifications and structural changes may be made without departing from the spirit of the invention.

I claim:

1. An indicating shipping accelerometer comprision:
   (a) a transparent tube which serves as a housing;
   (b) a ball which serves as an inertial mass within said housing capable of being longitudinally displaced within said housing;
   (c) a spring on both sides of said inertial mass, to urge said inertial mass into an undisturbed position;
   (d) an indication means which is visibly disposed within said housings, and which is displaced by said inertial mass, and which retains the maximum displacement of the inertial mass;
   (e) a scale which is used to measure the displacement of the indicating means within the housing;
   (f) end-caps which close the ends of said housing.

2. An indicating shipping accelerometer according to claim 1 further comprising a strip of double sided adhesive tape, one side of which is secured to the indicating shipping accelerometer and the other side of which can be used to secure the indicating shipping accelerometer to another surface.

* * * * *